United States Patent
Subramony et al.

(10) Patent No.: US 11,347,289 B2
(45) Date of Patent: May 31, 2022

(54) ENABLING PERFORMANCE FEATURES FOR VOLTAGE LIMITED PROCESSORS

(71) Applicant: Advanced Micro Devices, Inc., Santa Clara, CA (US)

(72) Inventors: Mahesh Subramony, Austin, TX (US); David Suggs, Austin, TX (US); Michael T Clark, Austin, TX (US); Matthew M Crum, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/030,324

(22) Filed: Sep. 23, 2020

(65) Prior Publication Data
US 2022/0091653 A1    Mar. 24, 2022

(51) Int. Cl.
| *G06F 1/26* | (2006.01) |
| *G06F 1/32* | (2019.01) |
| *G06F 1/3206* | (2019.01) |
| *G06F 1/28* | (2006.01) |
| *G06F 1/3287* | (2019.01) |

(52) U.S. Cl.
CPC .............. *G06F 1/3206* (2013.01); *G06F 1/28* (2013.01); *G06F 1/3287* (2013.01)

(58) Field of Classification Search
None
See application file for complete search history.

(56) References Cited

U.S. PATENT DOCUMENTS

| 6,721,892 B1* | 4/2004 | Osborn ................... G06F 1/329 |
| | | 713/300 |
| 2010/0064162 A1 | 3/2010 | Rotem et al. |
| 2012/0079290 A1 | 3/2012 | Kumar et al. |
| 2016/0077565 A1 | 3/2016 | Jayaseelan |
| 2016/0147275 A1* | 5/2016 | Weissmann ............. G06F 1/324 |
| | | 713/322 |
| 2019/0041925 A1* | 2/2019 | Ahuja ..................... G06F 1/206 |
| 2020/0029284 A1* | 1/2020 | Muthaiyan .......... H04W 52/365 |

OTHER PUBLICATIONS

International Search Report and Written Opinion, Application No. PCT/US2021/051011 dated Jan. 18, 2022.

* cited by examiner

*Primary Examiner* — Nitin C Patel
(74) *Attorney, Agent, or Firm* — Liang & Cheng, PC

(57) ABSTRACT

A method of operating a processing unit includes, in response to detecting that the processing unit is operating in a voltage limited state, calculating a set of headroom values by calculating a headroom value for each operational constraint in a set of operational constraints of the processing unit, based on the calculated set of headroom values, selecting from a set of performance features a subset of one or more performance features for enabling in the processing unit, and enabling the selected subset of performance features in the processing unit.

20 Claims, 4 Drawing Sheets

ENABLING PERFORMANCE FEATURES FOR VOLTAGE LIMITED PROCESSORS

BACKGROUND

Modern computing systems are designed to operate according to a set of thermal and electrical constraints. Ensuring operation within these constraints helps to prevent damage to computing system components and maximize the lifetime of the system. Processing units such as central processing units (CPUs) and graphics processing units (GPUs) can be damaged due to overheating and are therefore designed with operational safeguards that automatically shut down or throttle the processing unit or portions of the processing unit (e.g., specific cores) when the constraints are violated. Power consumption is thus reduced so that a safe operating temperature is maintained, and damage to the processing unit hardware is prevented.

Additionally, processing units are typically designed to perform tasks as quickly and efficiently as possible (e.g., maximizing performance per watt of power consumed) while operating within thermal and electrical constraints. One strategy for improving performance is to utilize higher efficiency mechanisms (e.g., a more efficient cooling system) for more effectively managing the thermal and electrical parameters, thus increasing headroom in the thermal and electrical constraints. This translates to being able to run the processor at a higher state, involving increasing frequency and voltage. Furthermore, the operating voltage can be optimized by mechanisms such as droop mitigation, in order to afford a higher effective voltage for the processor and, as a result, achieve higher performance.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

In one embodiment, the operation of a processor is limited by thermal and electrical operational constraints including thermally designed power (TDP), thermally designed current (TDC), electrically designed current (EDC) and/or operating temperature (Tj). The TDP is the maximum amount of heat generated by the processing unit or component (e.g., central processing unit (CPU) graphics processing unit (GPU), etc.) that can be dissipated by the computer's cooling system. The TDC is the maximum amount of current that can be delivered by the computer system's voltage regulators without violating thermal constraints. EDC is the maximum amount of peak current that can be delivered by the computing system's voltage regulators.

With increasing power efficiency delivered by advanced computing nodes, processing units in such nodes are no longer bound by the TDC, TDP, EDC or Tj constraints for certain types of workloads. With functional defects and long term reliability problems manifesting at higher voltages, processing units are instead being limited by the operating voltage.

The computational performance of a processor already operating at its voltage limit can be further increased if headroom still exists in the above thermal and electrical constraints. In one embodiment, processor features that increase performance without an increase in operational voltage are identified and enabled. The features to be enabled are selected based on their impact to the thermal and electrical budget available so that violating the thermal and electrical constraints (e.g., TDC, TDP, EDC, Tj) is avoided.

During operation of the processor, a performance optimization framework detects when the processor is operating at its voltage limit, responds to the voltage limited condition by identifying processor features that can be enabled without violating the thermal and electrical constraints, and enables the identified features to improve the processor's computational performance. The framework thus dynamically maximizes processor performance while allowing the processor to continue operating within the reliability limits enforced by the voltage limited state.

Figure 1:
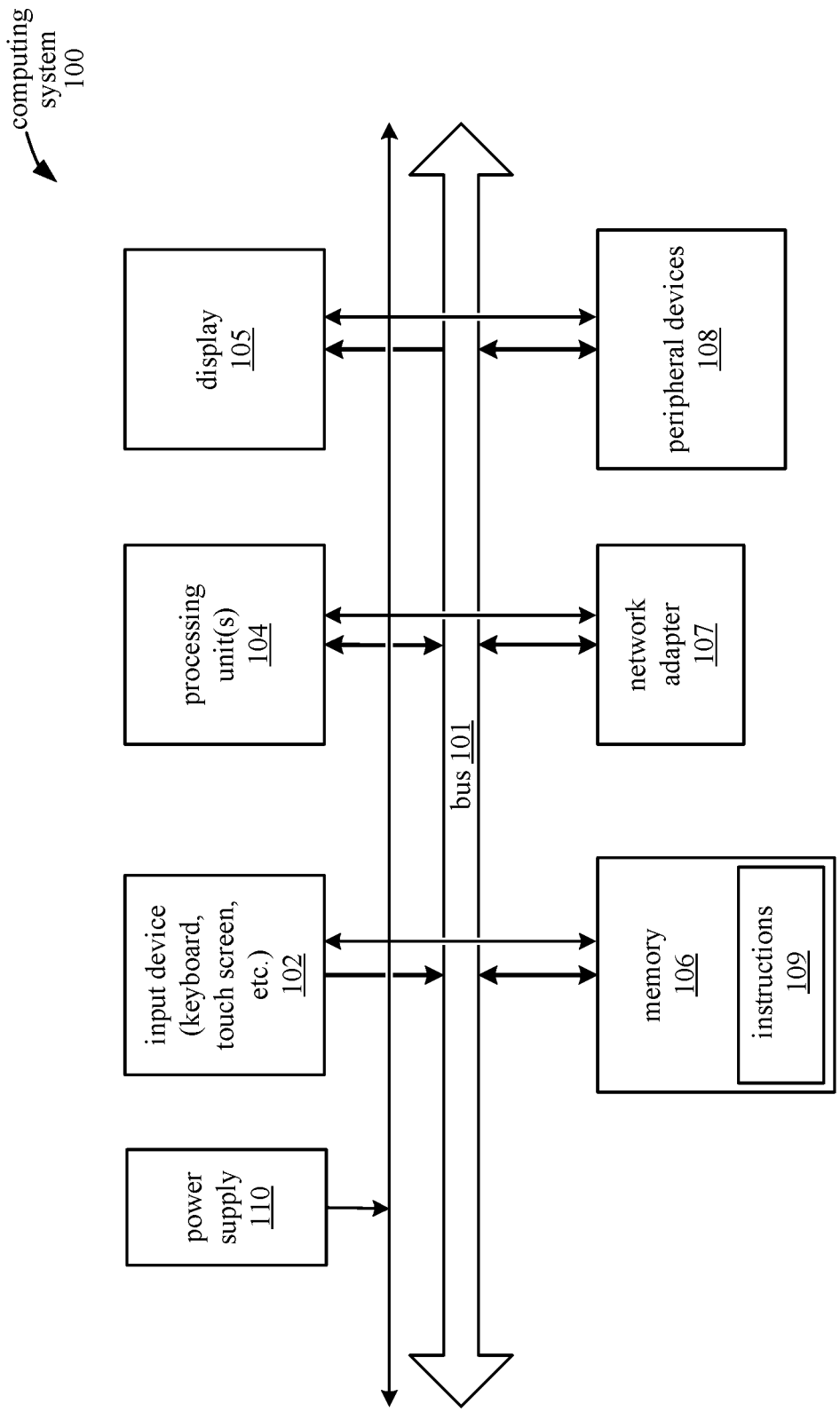
FIG. 1 illustrates a computing system, according to an embodiment.

FIG. 1 illustrates an embodiment of a computing system 100 in which the above framework for increasing computational performance (e.g., as measured by instructions per cycle) of a voltage limited processor is implemented. In general, the computing system 100 is embodied as any of a number of different types of devices, including but not limited to a laptop or desktop computer, mobile device, server, etc. The computing system 100 includes a number of components 102-108 that communicate with each other through a bus 101. In computing system 100, each of the components 102-108 is capable of communicating with any of the other components 102-108 either directly through the bus 101, or via one or more of the other components 102-108. The components 101-108 in computing system 100 are contained within a single physical enclosure, such as a laptop or desktop chassis, or a mobile phone casing. In alternative embodiments, some of the components of computing system 100 are embodied as peripheral devices such that the entire computing system 100 does not reside within a single physical enclosure.

The computing system 100 also includes user interface devices for receiving information from or providing information to a user. Specifically, the computing system 100 includes an input device 102, such as a keyboard, mouse, touch-screen, or other device for receiving information from the user. The computing system 100 displays information to the user via a display 105, such as a monitor, light-emitting diode (LED) display, liquid crystal display, or other output device.

Computing system 100 additionally includes a network adapter 107 for transmitting and receiving data over a wired or wireless network. Computing system 100 also includes one or more peripheral devices 108. The peripheral devices 108 may include mass storage devices, location detection devices, sensors, input devices, or other types of devices used by the computing system 100.

Computing system 100 includes one or more processing units 104, which in the case of multiple processing units 104 are capable of operating in parallel. The processing units 104 receive and execute instructions 109 that are stored in the memory subsystem 106. In one embodiment, each of the processing units 104 includes multiple computing nodes that reside on a common integrated circuit substrate. Memory subsystem 106 includes memory devices used by the computing system 100, such as random-access memory (RAM) modules, read-only memory (ROM) modules, hard disks, and other non-transitory computer-readable media.

Some embodiments of computing system 100 may include fewer or more components than the embodiment as illustrated in FIG. 1. For example, certain embodiments are implemented without any display 105 or input devices 102. Other embodiments have more than one of a particular component; for example, an embodiment of computing system 100 could have multiple buses 101, network adapters 107, memory devices 106, etc. Power is supplied to the components 101-108 in the computing system 100 by a power supply 110.

Figure 2:
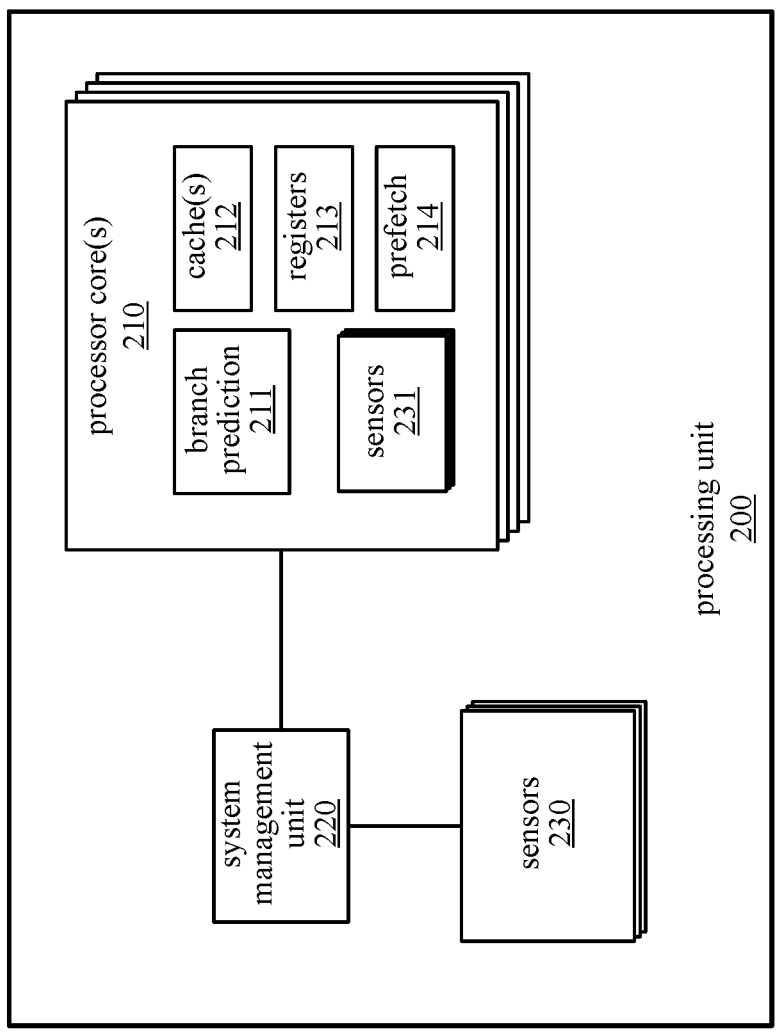
FIG. 2 illustrates a processing unit, according to an embodiment.

FIG. 2 illustrates hardware components in a processing unit 200, representing one of processing unit(s) 104, according to an embodiment. The processing unit 200 includes a set of one or more processor cores 210, a system management unit 220, and sensors 230 residing on a single integrated circuit die. In alternative embodiments, some or all of the components 210-230 are located on separate die or in separate device packages. The components 210-230 are implemented using hardware circuitry or a using a combination of hardware, software, and/or firmware components.

The system management unit 220 monitors thermal and power conditions, and controls the operation of the processor cores to optimize performance or to prevent conditions that could damage the processing unit 200 (e.g., by throttling the cores 210 in response to an overheat condition). In addition, the system management unit 220 implements a performance optimization framework for monitoring the operating voltage and the TDC, EDC, TDP, and Tj operational constraints to determine whether the processing unit 200 is limited by operating voltage. When the processing unit 200 is not operating in a voltage limited state, the processor cores 210 maximize performance-per-watt by avoiding higher power consumption computing strategies that result in marginal improvement in performance, thus reducing unnecessary work and maximizing performance-per-watt.

When the processing unit 200 is operating in a voltage limited state, then the operating voltage supplying the processing unit cannot be increased further without exceeding a maximum voltage threshold Vmax. The performance optimization framework in the system management unit 220 determines the amount of headroom in each of the operational constraints of the system, such as EDC, TDC, TDP, Tj, and Vmax, and enables features that will enhance performance (e.g., as measured by instructions per cycle) in the processing cores 210 without exceeding the operational constraints. In one embodiment, the enabling of some features by the framework decreases the overall power efficiency of the processing unit 200, but increases overall performance without exceeding the operational constraints.

Each of the operational parameters corresponding to one of the operational constraints (such as EDC, TDC, TDP, Tj, Vmax) being monitored are measured using a set of sensors 230-231, which includes sensors 231 positioned at strategic locations throughout the processor core(s) 210, as well as sensors 230 located elsewhere in the processing unit 200. The measured operational parameter values are transmitted to the system management unit 220 and used for calculating the amount of headroom available for each of the operational constraints. The system management unit 220 then identifies a set of one or more performance features that can be enabled without exceeding the operational constraints, based on the amount of headroom and a predetermined threshold value for each constraint. In one embodiment, the threshold value represents an expected penalty that will be incurred by enabling the set of features, such that the set of features is enabled if the available headroom exceeds the threshold value.

Workloads provided by instructions 109 are executed in the one or more processor core(s) 210 in the processing unit 200. Each of the processor core(s) 210 includes digital logic circuits that facilitate the execution process, such as a branch prediction module 211, one or more caches 212 and their cache controllers, registers 213, prefetch logic 214, etc. Some features are enabled by the performance optimization framework of the system management unit 220 by enabling additional functions of the digital logic circuits in the processor core(s) 210, such as a different and more compute-intensive branch prediction function. Enabling other features causes mechanisms or functions already operating in the processing core(s) 210 to operate according to different parameters; for example, an existing function (e.g., branch prediction, prefetching, etc.) can be tuned to perform a greater amount of speculative work (often performed in parallel) or to allow certain functions to be performed at a greater frequency, which results in an increase in performance at the expense of additional computation and power consumption.

Examples of performance features that can be enabled when the voltage limited mode is detected to achieve higher performance at the cost of higher activity may, depending upon system 100, include the following (other performance features may also be enabled in other systems):

Predictor efficiency: Predictor efficiency and performance is increased by enabling the use of predictive models and allowing the execution of light weight machine learning algorithms when the processing unit 200 is operating in a voltage-limited state.

Runahead execution: When in the voltage-limited state, allowing execution resources to calculate instruction and data stream fetches and branch outcomes and store them in a shift register increases the accuracy of branch predictors and increases the hit rate of prefetchers.

Cache Way Determination: In the non-voltage-limited state, way prediction is used to select cache ways for reading. In the voltage-limited state, cache hit times are decreased and performance increased, by enabling the reading of all cache ways instead of relying on way prediction.

Branch Predictor Lookup Parallelization: In the non-voltage-limited state, the branch prediction module 211 waits for a level 1 (L1) cache hit before performing a level 2 (L2) cache lookup. In the voltage-limited state, lower cache latency is achieved by enabling the use of additional compute resources to implement a predictor for performing the L2 cache lookup in parallel with the L1 cache lookup.

Allow more frequent OC-IC mode switching: Switching between op-cache (OC) and instruction cache (IC) costs energy. During non-voltage-limited operation, excessive mode switching is prevented to minimize the energy cost. In the voltage-limited state, performance is increased by allowing more frequent mode switching between the OC and the IC.

Condense sparseness of OC: In the non-voltage-limited state, lines in the OC are built from lines in the IC only when a hit occurs in the IC; that is, OC lines are only built for IC lines that are being reused in order to save power. In the voltage-limited state, performance is increased when OC lines are built from IC lines regardless of whether hits have occurred in the IC lines.

Simultaneous Multi-threading (SMT) Scheduling Every Cycle: Certain components in the execution pipeline process only one thread in a given cycle and thus switch between threads when multiple threads are being executed. Switching between threads incurs an energy penalty as combinatorial multiplexor logic nodes transition states to reflect the new thread state. In the non-voltage-limited state, switching between threads occurs less frequently (e.g., every 2 or 4 cycles instead of every cycle) to save power. In the voltage-limited state, performance is increased by allowing thread switching at every cycle.

The registers 213 in the processor core(s) include configuration registers for enabling and controlling the operation of the different digital logic circuits in the processor core(s) 210. Accordingly, features are enabled by asserting specific configuration bits in the registers 213, or by changing values in the registers 213 that control operational parameters of the branch prediction module 211, cache(s) 212, prefetcher 214, or other logic circuits.

Figure 3:
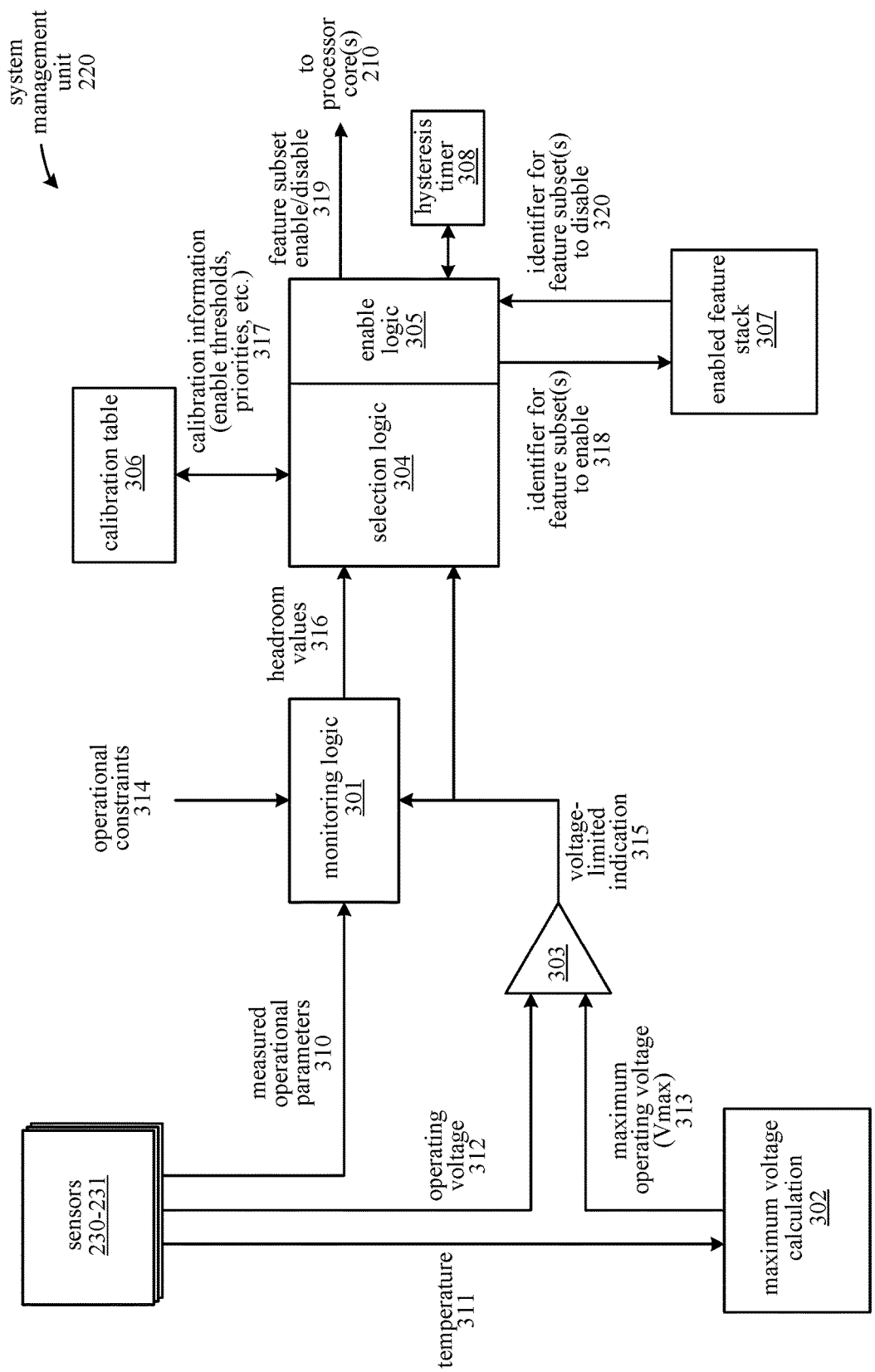
FIG. 3 illustrates a performance optimization framework in a system management unit, according to an embodiment.

FIG. 3 illustrates components of a performance optimization framework in a system management unit 220, according to an embodiment. The system management unit 220 includes a module 302 for determining a maximum operating voltage Vmax for the system, monitoring logic 301 for calculating the amount of available headroom 316 for each of the operational constraints 314, selection logic 304 for identifying a set of performance features to enable, and enable logic 305 for enabling and disabling performance features.

The maximum voltage calculation module 302 calculates a maximum operating voltage Vmax, which can change depending on a temperature 311 of the system. The maximum voltage calculation module 302 receives an updated temperature value 311 from one or more of the sensors 230-231 and determines (e.g., by calculation, table lookup, etc.) the Vmax 313 at which the processing unit 200 is allowed to operate at temperature 311. In a comparison block 303, an updated operating voltage value 312 is received from the sensors 230-231 and is compared with the value of Vmax 313. The comparison block 303 generates a voltage limited indication 315, which is asserted to indicate that the processing unit 200 is operating in a voltage-limited state when the measured operating voltage 312 is equal to or greater than Vmax 313. If the measured operating voltage 312 is not greater than or equal to Vmax 313, the voltage-limited indication 315 is deasserted. When the processing unit 200 is operating in the voltage-limited state, some headroom is available in one or more of the other operational constraints 314.

The monitoring logic 301 calculates a set of headroom values 316 including a headroom value for each of the operational constraints 314, such as TDP, TDC, EDC, and Tj. The sensors 230-231 provide a set of measured operational parameters 310 to the monitoring logic 301, including an operational parameter corresponding to each of the constraints 314. In one embodiment, when the processing unit 200 is operating in a non-voltage limited state, the sensors 230-231 periodically sense a subset of the operational parameters at a specific frequency (e.g., power, current, and temperature sampled every 1 millisecond). When a voltage-limited state is detected, the sensors 230-231 increase the sensing frequency and/or start sensing of additional operational parameters. The increase in sensing frequency and/or enabling of additional sensors can increase power consumption, but allow the processing unit 200 to respond more quickly and accurately to changes caused by rapidly changing workloads or other conditions.

The measured operational parameters 310 are transmitted from the sensors 230-231 to the monitoring logic 301, and the headroom value for each constraint is calculated in the monitoring logic 301 by determining a difference between the constraint value and its corresponding measured operational parameter. For example, the available headroom for Tj is determined by a difference between the constraint Tj (i.e., a specified maximum operating temperature) and the measured operating temperature from the sensors 230-231. In one embodiment, the monitoring logic 301 calculates the headroom values 316 when the voltage-limited indication 315 indicates that the processing unit 200 is operating in the voltage-limited state. Alternatively, the monitoring logic 301 calculates the headroom values 316 regardless of whether the processing unit 200 is operating in the voltage-limited state or the non-voltage-limited state.

The monitoring logic 301 provides the headroom values 316 to the selection logic 304. The selection logic 304 selects a subset of performance features from a set of performance features that are supported in the processing unit 200. The subset of performance features is selected for enabling based on the available headroom indicated by the headroom values 316 and calibration information 317 for each of the feature subsets. Each subset of performance features includes one or more features that are enabled or disabled together, where each feature can be present in multiple feature subsets.

The selection logic 314 reads the calibration information 317 from a calibration table 306. The calibration table 306 associates each of the available feature subsets with calibration information for the subset, which includes enable thresholds, priorities, etc. In one embodiment, the calibration information for a feature subset includes an enable threshold for each of the operational constraints. The enable thresholds define a minimum amount of headroom for their corresponding operational constraints that is observed before the feature subset is enabled.

The enable thresholds, priorities, and other calibration information 317 for a feature subset are determined by a calibration process in which the performance features in the subset are toggled on and off during execution of one or more benchmark routines in the processing core(s) 210. The impact of enabling the feature subset is determined by comparing operational parameters measured when the feature set is disabled with the operational parameters measured when the feature set is enabled. The change in each operational parameter is recorded as an enable threshold for the operational constraint associated with the operational parameter. For example, if enabling a feature subset causes an increase in the operating temperature of $\Delta T$, then $\Delta T$ is recorded as the enable threshold associated with the maximum operating temperature constraint Tj. Accordingly, the feature subset is not enabled if the available headroom for Tj is less than $\Delta T$, since enabling the subset is expected to increase the operating temperature beyond Tj.

In addition to the enable thresholds, the calibration process also generates priority values for different feature subsets based on the expected increase in performance (as measured by, for example, instructions per cycle). The expected performance increase is measured for a feature subset by executing the benchmark routines with the feature subset disabled and enabled. A priority value is then assigned to the feature subset based on the measured increase in performance, with higher priority values assigned to feature subsets that effect greater increases in performance (e.g., as measured by instructions per cycle).

The calibration process thus determines a set of enable thresholds and priority values for each of the available feature subsets that can be enabled in the processing core(s) 210. Since a given feature can have different effects on operational parameters and performance depending on which other features are concurrently enabled, enable thresholds and priorities are recorded for feature subsets representing different combinations of features. In one embodiment, the calibration information 317 resulting from the calibration process is unique to each processing unit 200, and calibration is performed independently for each processing unit device.

In one embodiment, calibration is performed for each feature subset using different benchmark routines for simulating different types of workloads. The selection logic 304 then selects a feature subset to enable based on the set of enable thresholds for a workload type that most closely matches the actual workload being executed in the processor core(s) 210 at runtime. For example, a cache-intensive benchmark routine can be executed during calibration to generate a set of enable thresholds for a feature subset. Then, if the selection logic 304 determines that a cache-intensive workload is being executed in a voltage-limited state, the selection logic 304 uses the enable thresholds generated using the cache-intensive benchmark routine when determining whether the feature subset can be enabled without violating any operational constraints 314.

The sets of enable thresholds and other calibration information generated by the calibration process are stored in the calibration table 306. When the selection logic 304 detects that the processing core(s) 210 are operating in a voltage-limited state via the voltage-limited indication signal 315, the selection logic 304 determines which feature subsets, if any, can be enabled without violating the operational constraints 314 based on the updated headroom values 316 and the calibration information 317 for each of the candidate feature subsets. In particular, the selection logic 304 determines that a feature subset can be enabled without violating the operational constraints 314 by comparing each enable threshold for the feature subset with its corresponding headroom value. If each headroom value exceeds its corresponding enable threshold, then the selection logic 304 determines that the feature subset can be enabled without violating the constraints 314. When sufficient headroom exists for enabling multiple alternative feature subsets, higher priority feature subsets are selected first, since enabling these feature subsets results in the highest expected increase in performance.

Once a subset of performance features is selected for enabling by the selection logic 304, the enable logic 305 enables the selected feature subset. In response to the enabling, a greater number of speculative computations, mode switches, and/or other performance enhancing activities are performed by the processor core(s) 210 (e.g., by the branch prediction module 211, cache(s) 212, prefetch module 214, or other logic circuits). The enable logic 305 enables each of the performance features in the selected subset by causing bits to be asserted or values to be written in configuration registers that enable or control operational parameters of the digital logic circuits implementing the features. In one embodiment, appropriate values are written to the configuration registers by microcode executing in the processing core(s) 210 in response to an enable signal 319 received from the enable logic 305. In various embodiments, the enable signal 319 can be implemented as a message transmitted to the processor core(s) 210, a set of direct wires to the digital logic circuits implementing the performance features, or another type of signal identifying the feature or features to be enabled.

The performance optimization framework also includes an enabled feature stack 307 for keeping track of enabled feature subsets. When enabling a feature subset, the enable logic 305 records an identifier 318 for the feature subset in the stack 307 by pushing the identifier 318 onto the top position of the stack 307. Thus, identifiers for the enabled feature subsets are recorded in the stack in the order in which they were enabled, with identifiers of more recently enabled subsets closer to the top of the stack.

When the enable logic 305 detects via the voltage-limited indication 315 that the processing unit 200 is no longer operating in the voltage-limited state, the enable logic 305 disables the most recently enabled subset of performance features. In some cases, the processing unit 200 ceases operating in the voltage-limited state due to changes in workload, environment, or other operating conditions that cause an operational constraint to be exceeded. The operating voltage is decreased until no operational constraints are exceeded. In some cases, one or more operational constraints are exceeded due to enabling of a feature subset. When the processing unit 200 ceases operation in the voltage-limited state, the enable logic 305 retrieves the identifier 320 from the top position of the enabled feature stack 307 and disables the feature subset identified by the identifier 320 (e.g., by effecting configuration register writes, deasserting the appropriate enable signals, etc.).

The performance optimization framework also includes a hysteresis timer 308 that prevents feature subsets from being disabled too quickly after they are enabled. For each feature subset that is enabled, the hysteresis timer 308 records an indication of how much time has elapsed since the feature subset was enabled. In one embodiment, the hysteresis timer 308 stores a timestamp indicating when the feature subset was enabled. Alternatively, the timer 308 may store a counter value that is incremented periodically. The hysteresis timer 308 value for a feature subset is started or set when the subset is enabled. Then, the enable logic 305 checks the hysteresis timer 308 and does not disable the feature subset until after the timer 308 for the subset has expired.

In cases where one or more operational constraints are exceeded due to enabling of a subset of performance features, the enable thresholds for the subset stored in the calibration table 306 are updated. For example, the calibration process may determine a set of enable thresholds for a particular subset that is inaccurate for the actual operating conditions or workload at runtime. Threshold values that are too low can cause feature subsets to be enabled when insufficient headroom is available. Threshold values that are too high can prevent feature subsets from being enabled when sufficient headroom is available. Accordingly, threshold values that are determined to be inaccurate are modified by the selection logic 304 by changing the stored value in the calibration table 306, updating a correction value that is added or subtracted from the original calibrated threshold value, or otherwise overriding the original value.

In one embodiment, calibration values are updated for a feature subset when the feature subset is disabled. Enabling of the feature subset based on inaccurate threshold values can lead to the operational constraints being exceeded. This in turn causes the processing unit 200 to cease operating in the voltage-limited state as the operating voltage is decreased until the constraints are no longer exceeded, and enable logic 305 responds by disabling the feature subset. Upon disabling of the feature subset by the enable logic 305, the selection logic 304 updates the enable threshold values for the feature subset being disabled. Changes in the operational parameters 310 observed when the feature subset was enabled are used to determine the new enable thresholds.

Figure 4:
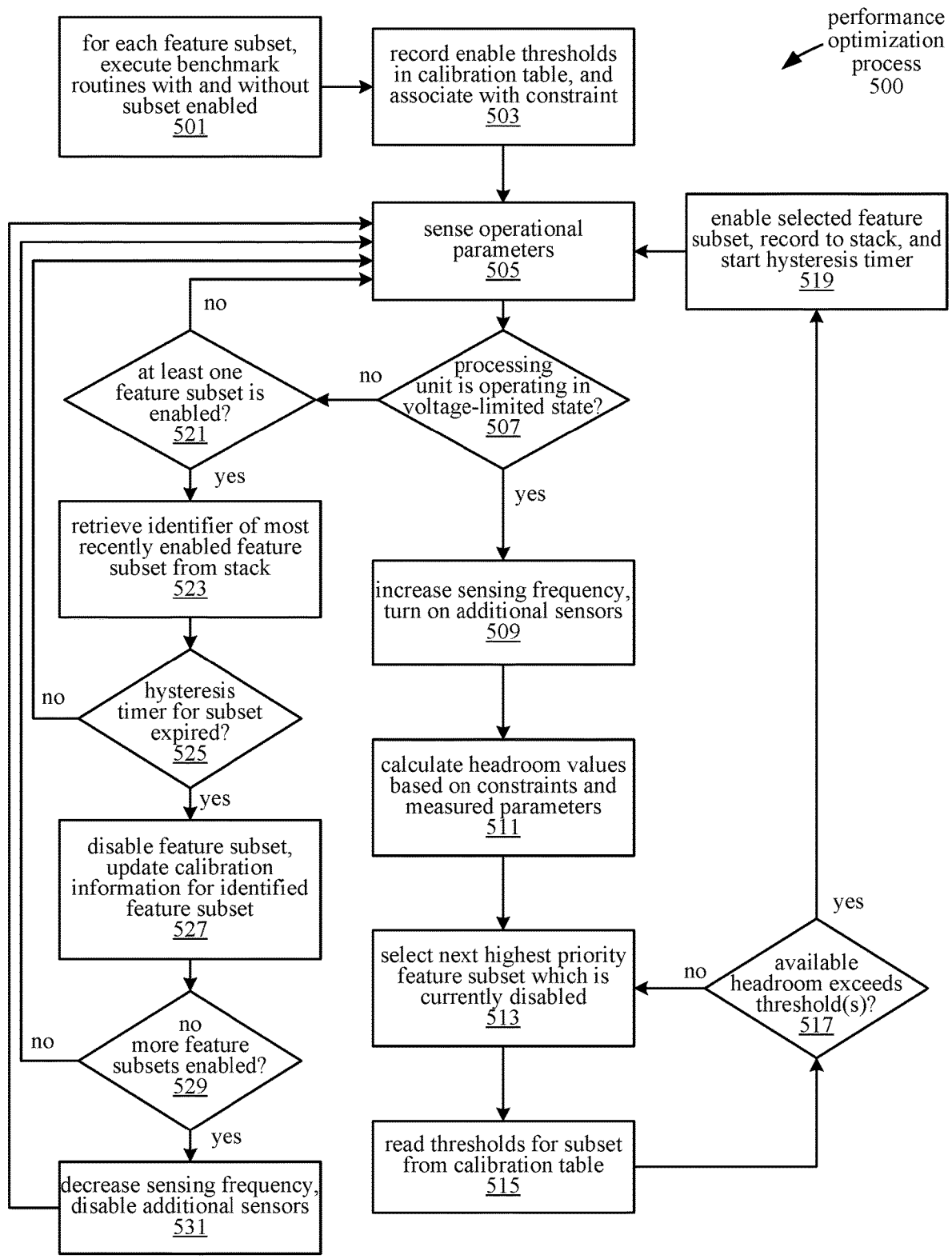
FIG. 4 illustrates a performance optimization process, according to an embodiment.

FIG. 4 is a flow diagram illustrating a performance optimization process 500, according to an embodiment. The performance optimization process 500 is performed by the components in the processing unit 200, including the components of the performance optimization framework in the system management unit 220. The operations of the process 500 are performed by hardware circuitry in the processing unit, or by a combination of hardware, software, and/or firmware.

A calibration process is performed by the processor core(s) 210 and the performance optimization framework at block 501-503. At block 503, the processor core(s) 210 execute, for each subset of performance features, a set of benchmark routines with and without the subset enabled. For each feature subset, the enable thresholds and priorities are determined based on the benchmark executions and are recorded in the calibration table 306 as provided at block 503.

At block 505, the sensors 230-231 are used to sense operational parameters such as power, current, and temperature. The measured operational parameters are sensed periodically (e.g., every millisecond), and each of the sensed operational parameters corresponds to one of the operational constraints, such as TDP, TDC, EDC, and Tj.

At block 507, the framework determines whether the processing unit 200 is operating in a voltage-limited state, in which the operating voltage has reached the maximum voltage Vmax. If the processing unit 200 is operating in a voltage-limited state, the process 500 continues at block 509. When operating in the voltage-limited state, the sensors 230-231 sample the operational parameters at a higher frequency, as provided at block 509. Additional sensors are also enabled to sense other operational parameters. The additional sensor data allows the performance optimization framework to more rapidly respond to changes in the operational parameters that could cause the corresponding operational constraints to be exceeded.

At blocks 511-519, the framework performs a process of determining whether any subsets of performance features from the set of performance features supported by the processing unit 200 can be enabled without exceeding operational constraints and if so, enabling the one or more subsets. At block 511, the monitoring logic 301 determines a set of headroom values 316 for each of the operational constraints 314 by calculating a difference between the operational constraints 314 and their corresponding measured operational parameters 310. The operational constraints include, for example, the TDP, TDC, EDC, and Tj constraints of the processing unit.

At block 513, the selection logic 304 identifies the feature subset having the highest priority value and that is currently disabled based on priority information from the calibration table 306. At block 515, the selection logic reads the enable thresholds for the identified highest priority feature subset from the calibration table 306. At block 517, the selection logic 304 compares the enable thresholds for the feature subset with their corresponding calculated headroom values 316. If a headroom value exceeds its corresponding enable threshold, then enabling the feature subset is expected not to cause the constraint to be exceeded.

It should be noted that some constraints (e.g., maximum allowable values) are exceeded when their respective operational parameters are higher than the constraint value, while other constraints (e.g., minimum allowable values) are exceeded when their operational parameters are lower than the constraint value. Accordingly, the available headroom exceeds the enable threshold when absolute value of the headroom is greater than the absolute value of the enable threshold.

If any of the headroom values 316 does not exceed its corresponding enable threshold, then enabling the feature subset is expected to cause the constraint to be exceeded. In this case, the feature subset is not selected for enabling, and the process 500 returns to block 513 to determine whether the next highest priority feature subset can be enabled.

At block 517, if all of the headroom values 316 exceed their respective enable thresholds, then enabling the feature subset is expected not to cause any of the operational constraints 314 to be exceeded. In this case, the process 500 continues at block 519. At block 519, the enable logic 305 enables the selected feature subset in the processing unit 200. The enable logic 305 enables each performance feature in the subset by asserting an enable signal for the feature, sending a message to the processor core(s) 210, effecting one or more configuration register writes, or otherwise communicating with the processor core(s) 210. Enabling the performance features causes an increase in the amount of computation (e.g., for speculative work, mode switching, etc.) and power consumption in logic circuits (e.g., branch prediction module 211, prefetch module 214, etc.) operating in the processor core(s) 210. At block 519, an identifier for the enabled subset of performance features is also recorded onto the top position of the enabled feature stack 307, and a hysteresis timer 308 is started or set for the enabled feature subset. From block 519, the process 500 returns to block 505 to continue measuring the operational parameters and to identify any additional feature subsets that can be enabled to further optimize performance. If the processing unit 200 continues to operate in the voltage-limited state after enabling of the feature subset, the framework determines whether another feature subset can be enabled in a subsequent iteration of blocks 509-519. In this manner, additional feature subsets are enabled until the processing unit 200 is no longer operating in the voltage-limited state, or no additional feature subsets can be enabled without exceeding one or more operational constraints.

At block 507, if the processing unit 200 is not operating in a voltage-limited state, the process 500 continues to blocks 521-531, in which the most recently enabled feature subset is disabled. When the processing unit 200 is operating in a non-voltage-limited state, then at least one of the operational constraints is at its limit. At block 521, if no subset of the performance features is enabled, the process 500 returns to block 505 to continue monitoring operational parameters and identify any feature subsets that can be enabled. If at least one feature subset is enabled, the process 500 continues at block 523.

At block 523, the enable logic 305 retrieves the identifier of the most recently enabled subset of performance features from the top of the enabled feature stack 307. At block 525, the enable logic 305 determines whether the hysteresis timer 308 has expired for the identified most recently enabled subset. At block 525, if the hysteresis timer 308 has not expired, the process 500 returns to block 505 without disabling the feature subset. The hysteresis timer 308 thus prevents the feature subset from being disabled too quickly after it is enabled. At block 525, if the enable logic 305 determines that the hysteresis timer 308 is expired for the most recently enabled feature subset, the process 500 continues at block 527.

At block 527, the enable logic 305 disables the identified most recently enabled feature subset. At block 527, the selection logic 304 also updates the calibration information 317 for the subset being disabled. The selection logic 304 modifies the set of threshold values and/or priority values associated with the feature subset in the calibration table 306. Updated threshold values are calculated based on the effect of enabling the subset on the measured operational parameters 310. Updated priority values are determined based on the effect on performance of enabling the feature subset.

At block 529, if any subsets of performance features remain enabled, the process 500 returns to block 505 without changes to the operation of sensors 230-231. However, if no more subsets of performance features are enabled, then the sensing frequencies of the sensors 230-231 are reverted and any additional sensors that were previously enabled are disabled at block 531, reversing the changes in block 509. Sensor activity is thus decreased to save power when none of the performance features using the additional sensor data are enabled. From block 531, the process 500 returns to block 505 to continue sensing the operational parameters 310 and identify feature subsets to enable when the voltage-limited state is again detected. If the processing unit 200 continues operating in the voltage-limited state, the next most recently enabled feature subset, if any, is disabled according to blocks 521-531. In this manner, the feature subsets are disabled in the reverse order in which they were enabled until no more feature subsets are enabled, or the processing unit 200 returns to operating in the voltage-limited state.

A method of operating a processing unit includes, in response to detecting that the processing unit is operating in a voltage limited state, calculating a set of headroom values by calculating a headroom value for each operational constraint in a set of operational constraints of the processing unit, based on the calculated set of headroom values, selecting from a set of performance features a subset of one or more performance features for enabling in the processing unit, and enabling the selected subset of performance features in the processing unit.

The method further includes, for each subset of a plurality of feature subsets each including a different subset of the set of performance features, executing a benchmark routine in the processing unit using performance features included in the subset to determine for the subset an enable threshold for each operational constraint in the set of operational constraints, and for each operational constraint in the set of operational constraints, associating the enable threshold for the operational constraint with the subset in a calibration table.

The method further includes, for at least one subset of the plurality of feature subsets, modifying the enable threshold in response to detecting that the processing unit has ceased operating in the voltage limited state after enabling of the at least one subset.

In the method, the operational constraints include a thermally designed power, a thermally designed current, an electrically designed current, and a maximum operating temperature of the processing unit.

In the method, for each operational constraint of the set of operational constraints, the method further includes measuring an operational parameter associated with the operational constraint. Calculating the headroom for the operational constraint includes calculating a difference between the measured operational parameter and the operational constraint.

The method further includes periodically sensing one or more operational parameters of the processing unit, and in response to detecting that the processing unit is operating in the voltage limited state, increasing a frequency of the sensing.

In the method, selecting the subset of performance features for enabling includes reading from a calibration table a set of enable thresholds associated with the subset. The subset is selected based on comparing each enable threshold in the set of enable thresholds with a corresponding headroom value in the calculated set of headroom values.

In the method, enabling the selected subset of performance features includes increasing an amount of computation performed by a logic circuit operating in the processing unit.

In the method, enabling the selected subset of performance features includes recording an identifier for the selected subset onto a stack. The method further includes, after the enabling of the selected subset of performance features and in response to detecting that the processing unit has ceased operating in the voltage limited state, retrieving the identifier from a top position of the stack, and based on the identifier, disabling the selected subset of performance features corresponding to the identifier.

A computing device includes monitoring logic for calculating a set of headroom values by calculating a headroom value for each operational constraint in a set of operational constraints of a processing unit, selection logic coupled with the monitoring logic for, in response to detecting that the processing unit is operating in a voltage limited state and based on the calculated set of headroom values, selecting from a set of performance features a subset of one or more performance features for enabling in the processing unit, and enable logic coupled with the selection logic for enabling the selected subset of performance features in the processing unit.

The computing device, further includes a set of processor cores to, for each subset of a plurality of feature subsets each including a different subset of the set of performance features, execute a benchmark routine using performance features included in the subset to determine for the subset an enable threshold for each operational constraint in the set of operational constraints, and a calibration table to, for each operational constraint in the set of operational constraints, store an association between the enable threshold for the operational constraint with the subset.

In the computing device, the selection logic, for at least one subset of the plurality of feature subsets, modifies the enable threshold for each operational constraint in the set of operational constraints in response to detecting that the processing unit has ceased operating in the voltage-limited state after enabling of the at least one subset.

The computing device further includes a plurality of sensors coupled with the monitoring logic that, for each operational constraint of the set of operational constraints, measures an operational parameter associated with the operational constraint. The monitoring logic, for each operational constraint of the set of operational constraints, calculates the headroom for the operational constraint by calculating a difference between the operational constraint and the measured operational parameter associated with the operational constraint.

The computing device further includes a plurality of sensors coupled with the monitoring logic for periodically sensing one or more operational parameters of the processing unit, and in response to detecting that the processing unit is operating in the voltage limited state, increasing a frequency of the periodic sensing.

The computing device further includes a calibration table coupled with the selection logic and for storing a set of enable thresholds for the selected subset of performance features. The selection logic selects the subset of performance features for enabling by reading the set of enable thresholds from the calibration table. The subset is selected based on comparing each enable threshold in the set of enable thresholds with a corresponding headroom value in the calculated set of headroom values.

The computing device further includes a stack coupled with the enable logic. The enable logic enables the selected subset of performance features by recording an identifier for the selected subset onto the stack, and after the enabling of the selected subset of performance features and in response to detecting that the processing unit is not operating in a voltage limited state, retrieves the identifier from a top position of the stack, and based on the identifier, disables the selected subset of performance features corresponding to the identifier.

A computing system includes a set of one or more processor cores in a processing unit and a system management unit coupled with the set of processor cores. The system management unit, in response to detecting that the processing unit is operating in a voltage limited state, calculates a set of headroom values by calculating a headroom value for each operational constraint in a set of operational constraints of the processing unit, based on the calculated set of headroom values, selects from a set of performance features a subset of one or more performance features for enabling in the processing unit, and enables the selected subset of performance features in the processing unit.

The computing system further includes a plurality of sensors coupled with the monitoring logic and each located in one of the set of processor cores. The plurality of sensors, for each operational constraint of the set of operational constraints, measures an operational parameter associated with the operational constraint, periodically senses one or more operational parameters of the processing unit, and in response to detecting that the processing unit is operating in the voltage limited state, increases a frequency of the periodic sensing. The system management unit, for each operational constraint of the set of operational constraints, calculates the headroom for the operational constraint by calculating a difference between the operational constraint and the measured operational parameter associated with the operational constraint.

In the computing system, the set of processor cores, in response to enabling of the selected subset of performance features, increases a number of speculative computations performed by a set of one or more logic circuits in the set of processor cores.

In the computing system, the set of processor cores determines a set of enable thresholds for the subset of performance features. The computing system further includes a calibration table coupled with the system management unit and configured to store the set of enable thresholds. The system management unit selects the subset of performance features for enabling by reading the set of enable thresholds from the calibration table and comparing each enable threshold in the set of enable thresholds with a corresponding headroom value from the set of calculated headroom values.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 100 and/or portions thereof carried on the computer-readable storage medium may be a database or other data structure which can be read by a program and used, directly or indirectly, to fabricate the hardware including the computing system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 100. The netlist may then be placed and routed to produce a data set describing geometric shapes to be applied to masks. The masks may then be used in various semiconductor fabrication steps to produce a semiconductor circuit or circuits corresponding to the computing system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A method of operating a processing unit, comprising:
responsive to a processing unit operating in a voltage limited state, enabling a subset of one or more performance features from a set of performance features in the processing unit, the subset of one or more performance features enabled responsive to headroom values for one or more operational constraints in a set of operational constraints of the processing unit.

2. The method of claim 1, further comprising:
for each subset of a plurality of feature subsets each including a different subset of the set of performance features:
executing a benchmark routine in the processing unit using performance features included in the subset to determine for the subset an enable threshold for each operational constraint in the set of operational constraints, and
for each operational constraint in the set of operational constraints, associating the enable threshold for the operational constraint with the subset in a calibration table.

3. The method of claim 2, further comprising:
for at least one subset of the plurality of feature subsets, modifying the enable threshold in response to detecting that the processing unit has ceased operating in the voltage limited state after enabling of the at least one subset.

4. The method of claim 1, wherein:
the operational constraints comprise a thermally designed power, a thermally designed current, an electrically designed current, and a maximum operating temperature of the processing unit.

5. The method of claim 1, further comprising, for each operational constraint of the set of operational constraints:
measuring an operational parameter associated with the operational constraint; and
calculating the headroom for the operational constraint by calculating a difference between the measured operational parameter and the operational constraint.

6. The method of claim 1, further comprising:
periodically sensing one or more operational parameters of the processing unit; and
in response to detecting that the processing unit is operating in the voltage limited state, increasing a frequency of the sensing.

7. The method of claim 1, wherein:
enabling the subset of one or more performance features reading from a calibration table a set of enable thresholds associated with the subset; and
the subset is selected based on comparing each enable threshold in the set of enable thresholds with a corresponding headroom value in the headroom values.

8. The method of claim 1, wherein:
enabling the selected subset of performance features comprises increasing an amount of computation performed by a logic circuit operating in the processing unit.

9. The method of claim 1, wherein:
enabling the selected subset of performance features comprises recording an identifier for the selected subset onto a stack; and
the method further comprises, after the enabling of the selected subset of performance features and in response to detecting that the processing unit has ceased operating in the voltage limited state:
retrieving the identifier from a top position of the stack, and
based on the identifier, disabling the selected subset of performance features corresponding to the identifier.

10. A computing device, comprising:
monitoring logic configured to calculate a set of headroom values by calculating a headroom value for each operational constraint in a set of operational constraints of a processing unit;
selection logic coupled with the monitoring logic and configured to, in response to detecting that the processing unit is operating in a voltage limited state and based on the calculated set of headroom values, select from a set of performance features a subset of one or more performance features for enabling in the processing unit; and
enable logic coupled with the selection logic and configured to enable the selected subset of performance features in the processing unit.

11. The computing device of claim 10, further comprising:
a set of processor cores configured to, for each subset of a plurality of feature subsets each including a different subset of the set of performance features, execute a benchmark routine using performance features included in the subset to determine for the subset an enable threshold for each operational constraint in the set of operational constraints; and
a calibration table configured to, for each operational constraint in the set of operational constraints, store an association between the enable threshold for the operational constraint with the subset.

12. The computing device of claim 11, wherein the selection logic is further configured to:
for at least one subset of the plurality of feature subsets, modify the enable threshold for each operational constraint in the set of operational constraints in response to detecting that the processing unit has ceased operating in the voltage-limited state after enabling of the at least one subset.

13. The computing device of claim 10, further comprising:
a plurality of sensors coupled with the monitoring logic and configured to, for each operational constraint of the set of operational constraints, measure an operational parameter associated with the operational constraint, wherein the monitoring logic is further configured to, for each operational constraint of the set of operational constraints, calculate the headroom for the operational constraint by calculating a difference between the operational constraint and the measured operational parameter associated with the operational constraint.

14. The computing device of claim 10, further comprising a plurality of sensors coupled with the monitoring logic and configured to:
- periodically sense one or more operational parameters of the processing unit; and
- in response to detecting that the processing unit is operating in the voltage limited state, increase a frequency of the periodic sensing.

15. The computing device of claim 10, further comprising:
- a calibration table coupled with the selection logic and configured to store a set of enable thresholds for the selected subset of performance features, wherein:
  - the selection logic is further configured to select the subset of performance features for enabling by reading the set of enable thresholds from the calibration table, and
  - the subset is selected based on comparing each enable threshold in the set of enable thresholds with a corresponding headroom value in the calculated set of headroom values.

16. The computing device of claim 10, further comprising:
- a stack coupled with the enable logic, wherein the enable logic is further configured to:
  - enable the selected subset of performance features by recording an identifier for the selected subset onto the stack, and
  - after the enabling of the selected subset of performance features and in response to detecting that the processing unit is not operating in a voltage limited state:
    - retrieve the identifier from a top position of the stack, and
    - based on the identifier, disable the selected subset of performance features corresponding to the identifier.

17. A computing system, comprising:
- a set of one or more processor cores in a processing unit; and
- a system management unit coupled with the set of processor cores and configured to, in response to detecting that the processing unit is operating in a voltage limited state:
  - calculate a set of headroom values by calculating a headroom value for each operational constraint in a set of operational constraints of the processing unit,
  - based on the calculated set of headroom values, select from a set of performance features a subset of one or more performance features for enabling in the processing unit, and
  - enable the selected subset of performance features in the processing unit.

18. The computing system of claim 17, further comprising:
- a plurality of sensors coupled with the monitoring logic and each located in one of the set of processor cores, wherein the plurality of sensors is configured to:
  - for each operational constraint of the set of operational constraints, measure an operational parameter associated with the operational constraint,
  - periodically sense one or more operational parameters of the processing unit, and
  - in response to detecting that the processing unit is operating in the voltage limited state, increase a frequency of the periodic sensing, wherein the system management unit is further configured to, for each operational constraint of the set of operational constraints, calculate the headroom for the operational constraint by calculating a difference between the operational constraint and the measured operational parameter associated with the operational constraint.

19. The computing system of claim 17, wherein:
the set of processor cores is configured to, in response to enabling of the selected subset of performance features, increase a number of speculative computations performed by a set of one or more logic circuits in the set of processor cores.

20. The computing system of claim 17, wherein:
the set of processor cores is further configured to determine a set of enable thresholds for the subset of performance features;
the computing system further comprises a calibration table coupled with the system management unit and configured to store the set of enable thresholds; and
the system management unit is further configured to select the subset of performance features for enabling by:
- reading the set of enable thresholds from the calibration table, and
- comparing each enable threshold in the set of enable thresholds with a corresponding headroom value from the set of calculated headroom values.

* * * * *